United States Patent [19]
Matlik

[11] 3,854,510
[45] Dec. 17, 1974

[54] TREE FELLING DEVICE

[75] Inventor: August Matlik, Gavle, Sweden

[73] Assignee: Brundell och Jonsson AB, Gavle, Sweden

[22] Filed: June 1, 1973

[21] Appl. No.: 366,018

[30] Foreign Application Priority Data
June 19, 1972  Sweden............................. 8067/72

[52] U.S. Cl................. 144/34 R, 83/788, 144/3 D
[51] Int. Cl............................................. A01g 23/08
[58] Field of Search ............ 30/383, 384, 385, 386, 30/387, 388; 144/2 Z, 3 D, 34 R, 34 A, 34 B, 34 E, 309 AC; 83/788, 795, 928

[56] References Cited
UNITED STATES PATENTS

| | | | |
|---|---|---|---|
| 3,059,491 | 10/1962 | Hoff et al.......................... | 83/788 X |
| 3,074,447 | 1/1963 | Bombardier...................... | 144/34 R |
| 3,267,973 | 8/1966 | Beard................................. | 30/386 |
| 3,461,929 | 8/1969 | Hunger et al..................... | 144/34 R |
| 3,540,501 | 11/1970 | Jonsson............................ | 144/34 E |
| 3,664,479 | 9/1971 | Jordan.......................... | 144/34 A X |

FOREIGN PATENTS OR APPLICATIONS
330,602 11/1970 Sweden............................ 144/34 R

*Primary Examiner*—Andrew R. Juhasz
*Assistant Examiner*—W. D. Bray
*Attorney, Agent, or Firm*—Wenderoth, Lind & Ponack

[57] ABSTRACT

A tree felling device comprising at least one endless saw chain carried by sprockets in a pivotable frame member, a saw blade mounted within the frame to guide the operative part of the chain and having at least the same thickness as the largest cross section of the saw chain, the pivot shaft of the frame member being located outside the saw chain at an angle of 0°–60° to the principal direction of the operative saw chain part, and any cross section of the saw blade perpendicular to the pivot being curved to form an arc with a radius corresponding to the perpendicular distance from the axis of the pivot.

4 Claims, 7 Drawing Figures

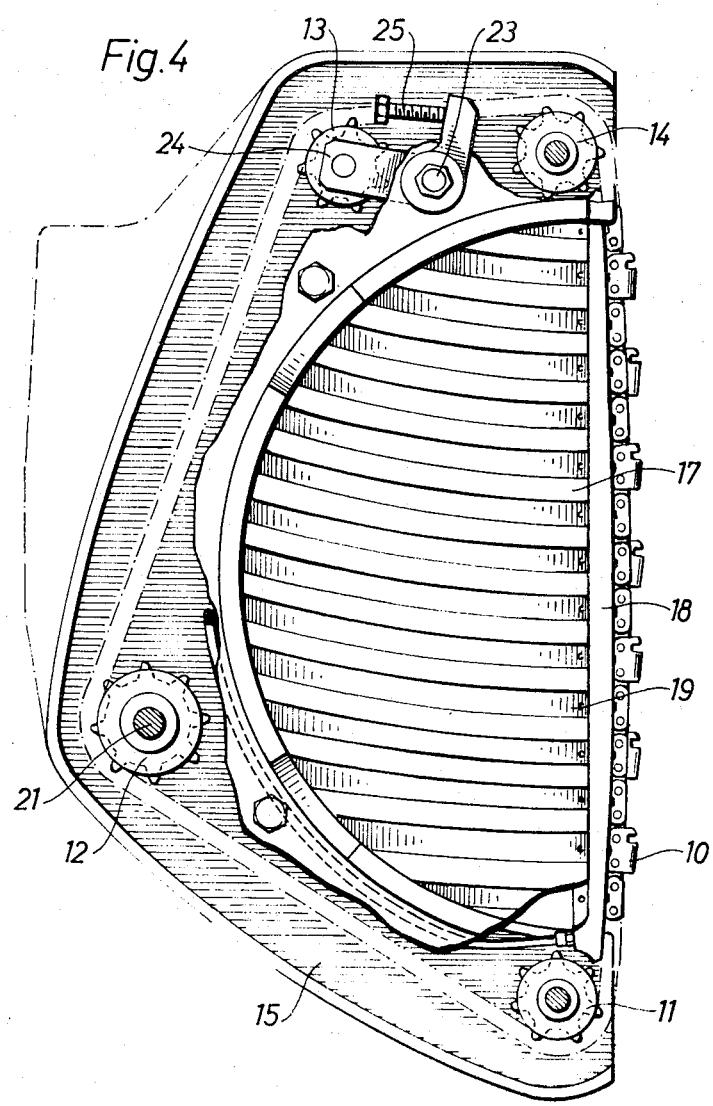
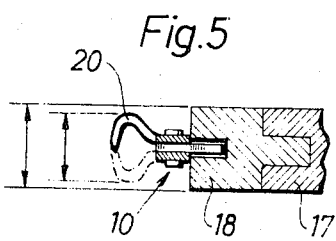

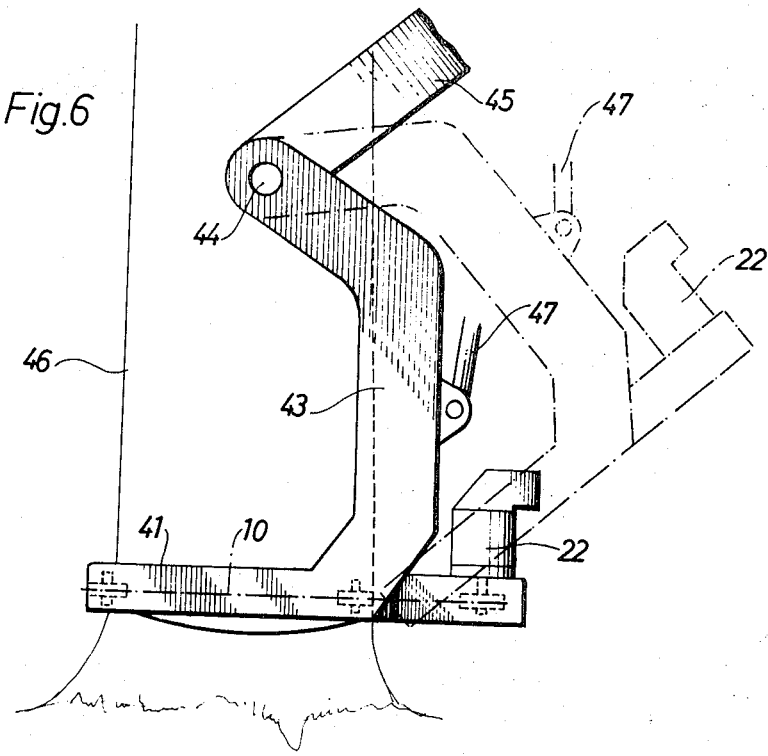
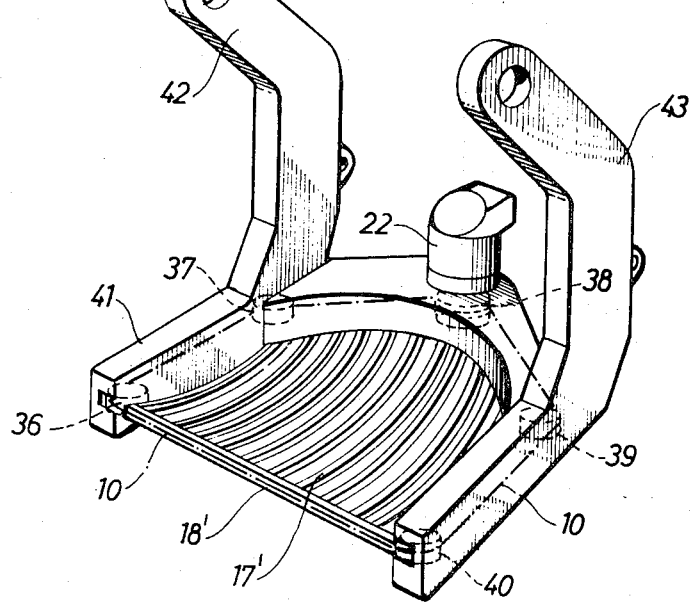

TREE FELLING DEVICE

BACKGROUND OF THE INVENTION

The invention relates to a tree feeling device of the type adapted to be operated when suspended in a crane beam. The device comprises at least one endless saw chain carried by sprockets which are journalled in an arcuate frame member. One of the sprockets is coupled to a driving motor, and means are provided for pivoting the frame member around a pivot shaft. Further, a saw blade mounted within the frame member has a grooved edge extending between the ends of the frame member to guide the operative part of the saw chain.

In a known apparatus of this kind (Swedish patent specification No. 330.602), two cooperating chain saws are mounted to be pivoted to and from each other in two parallel planes quite close to each other. Hereby, a rather large free space is required on the level where a tree has to be cut. Often thickets and deep snow are obstacles which obstruct cutting close to the ground so that the cut must be made at higher level. When leaving high stumps, however, a not negligible quantity of wood will be lost. A further inconvenience is that one of the saw chains is often clamped and stopped when the tree is partly cut through and thereby begins to lean in one direction.

SUMMARY OF THE INVENTION

The invention has for its object to eliminate these inconveniences. For that purpose, at least the chain guiding edge portion of the saw blade has at least the same thickness as the largest cross section of the saw chain. Further, the pivot shaft of the frame member is located outside the saw chain at an angle of 0-60° to the principal direction of the operative saw chain part, and in cross section perpendicular to the pivot shaft the saw blade is curved to form an arc with a radius substantially corresponding to the perpendicular distance from the axis of the pivot shaft. Preferably, the saw blade or at least its edge portion next to the operative part of the saw chain is a little thicker than the largest cross section of the saw chain, such as 0.5 to 2.0 mm, for instance, but the invention is, of course, not limited thereto.

A blade a little thicker than the largest cross section of the saw chain may easily be forced into the saw cut by means of hydraulic power, and then it will serve as an effective support for the tree section cut through so that the saw chain can continue to work without being subjected to an increased friction.

If the pivot shaft of the saw blade is parallel to the principal direction of the operative saw chain part, i.e., if the above discussed angle is 0, the blade will obviously form a segment of a cylinder. On the other hand, if the pivot shaft forms an acute angle to the principal direction of the chain part, the blade is curved to form a portion of the envelope surface of a cone. In both these embodiments the function is such that, when the saw blade is pivoted onto a tree to cut it, each point on the blade will move in an arcuate path having its greatest inclination to the horizontal plane in the outermost position of the blade. In practice, this means that the saw blade is moved from above and downwards in an arcuate path onto the tree, so that the cut may be made quite near to the ground without being hindered by low vegetation or snow.

BRIEF DESCRIPTION OF THE DRAWINGS

The tree felling apparatus according to the invention will be further described hereinafter with reference to the accompanying drawings in which:

FIG. 4 shows one of the saw blades from above;

FIG. 5 shows a cross section through a saw chain and an adjacent portion of the saw blade;

FIG. 6 is a diagrammatic side view of another embodiment having one single blade, and FIG. 7 shows a perspective view of the embodiment in FIG. 6.

DETAILED DESCRIPTION OF THE INVENTION

Figure 1:
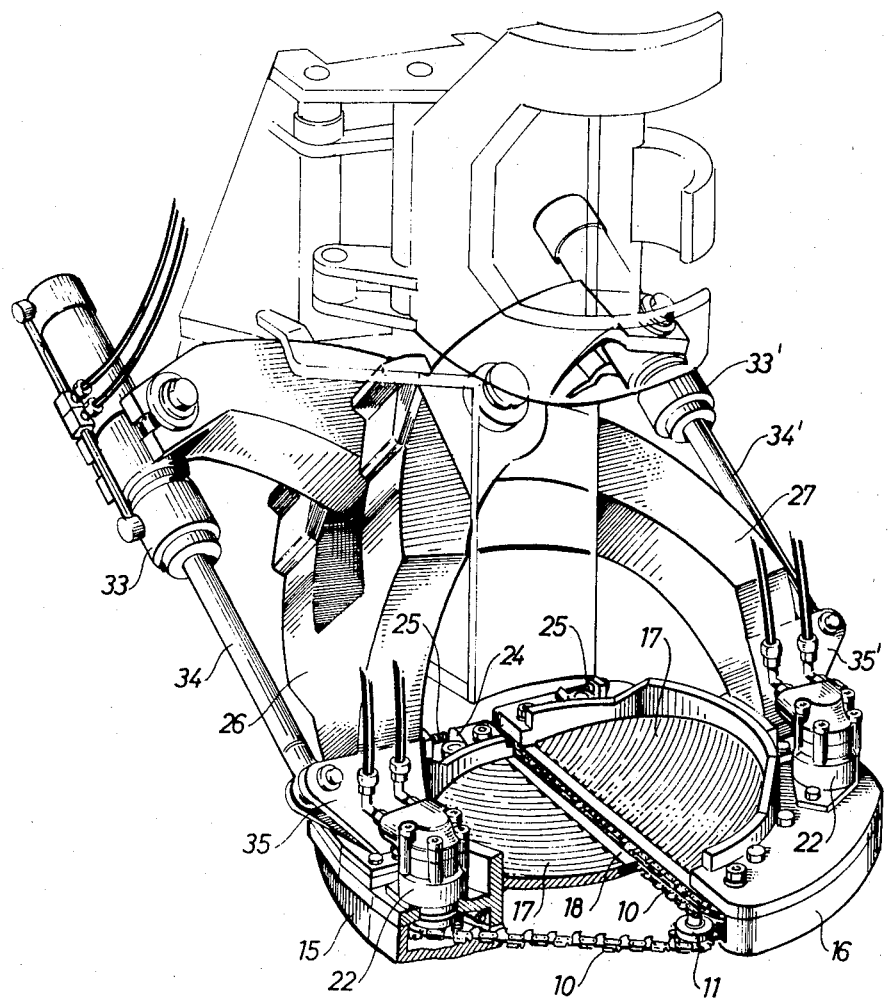
FIG. 1 shows a perspective view of an embodiment having two cooperating identical chain saws.
Figure 2:
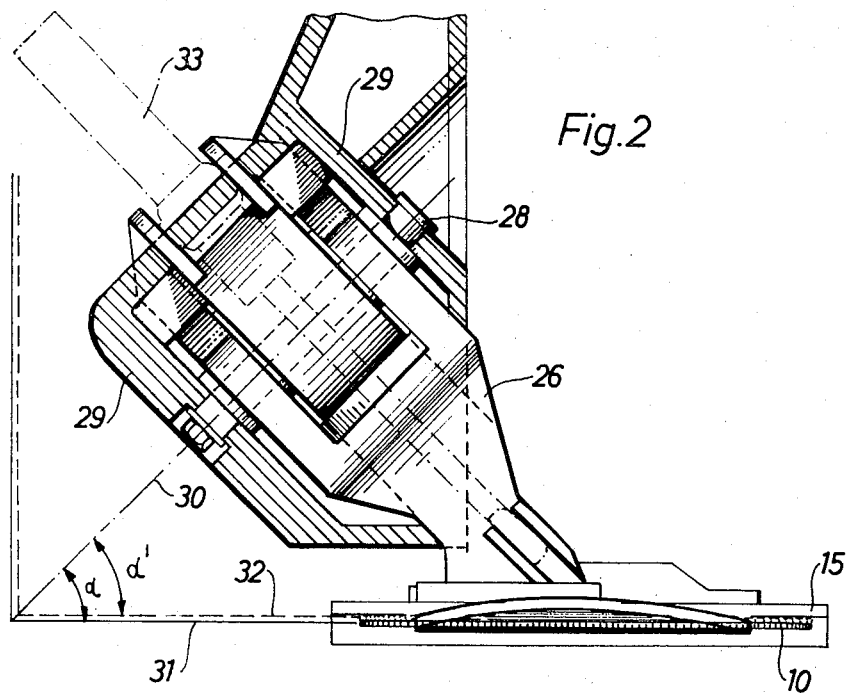
FIGS. 2 and 3 are diagrammatic views of the same apparatus, as seen from one side and from the front in open position, respectively.
Figure 3:
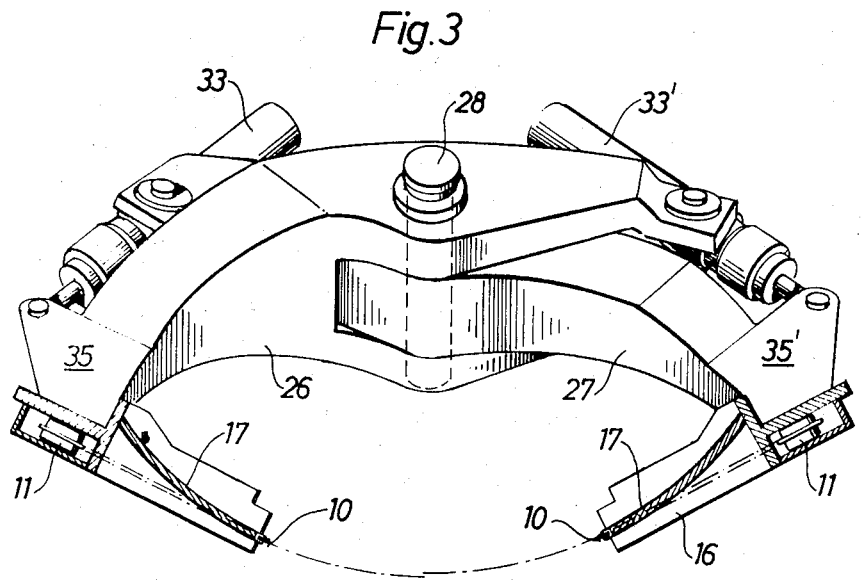

In FIGS. 1-4, each of two endless saw chains 10 extends in a loop around four sprockets 11-14 located in a common plane and journalled in an arcuate frame member 15 or 16 respectively. Each of the frame members 15,16 has a semicircular inside and encloses a correspondingly semicircular saw blade 17 secured thereto. The outer edge of the blade 17 is straight and extends between the ends of the frame member 15 or 16. A guide rule 18 (FIG. 5) secured to the straight edge of the blade has, in the known way, a longitudinal groove in its outside to receive and guide the operative part of the saw chain 10, i.e., the chain part adapted to cut through a tree. As appears from FIG. 5, the guide rule 18 as well as the blade 17 is a little thicker than the largest cross section of the teeth 20 of the saw chain 10. In the embodiment shown, both sides of the blade 17 are formed with rather wide flutes 19 (FIG. 4) extending substantially transversely to the rule 18 to reduce the adhesion between the blade and the cut surfaces of the tree.

The saw chain may be of a known design. In the embodiment shown, the teeth 20 are bent transversely and alternatively in opposite directions, as is indicated in FIG. 5.

One of the sprockets (the sprocket 12 in FIG. 4) is larger than the other and serves as driving wheel, in that its shaft 21 is connected to a hydraulic motor 22 mounted on the frame 15 or 16. Another sprocket 13 is journalled at one end of a bell crank 24 which is rotatably mounted by means of a pivot 23. To stretch the chain 10 the bell crank 24 may be rotated by means of a set screw 25.

The two frame members 15,16 are secured to the ends of arcuate levers 26 and 27, respectively, arranged to rotate in a common plane around a common pivot shaft 28 which is perpendicular to such common plane. The pivot 28 is, in the known way, mounted in a holder or bracket 29 (FIG. 2) which may be linked to a crane beam, not shown. The device is such that the operation parts of the chains 10 may be moved onto each other from an initial spaced position shown in FIG. 3 to the position shown in FIG. 1, where they are lying substantially parallel and close to each other, though in different planes so that their teeth don't cling to each other. One lever 26 may be shaped with a fork straddling the other lever 27, as is shown in FIG. 1. As appears from FIG. 2, the longitudinal directions of the rules 18 and thus of the operative chain parts form equal and acute angles α and α', respectively, to the axis 30 of the pivot shaft 28. In the embodiment shown, these angles are about 45°. This means that, when rotated around the pivot 28, the chain parts move along the envelope surfaces 31 and 32, respectively, of two imaginary cones having the axis 30 as common cone shaft. With regard to these rotary movements the saw blades 17 are curved transversely to their guide rules 18 in such a way that they are included in the envelope surfaces of the cones. In other words, each saw blade 17 is curved such that, when cutting through a tree, it follows its operative saw chain part through the cut without any noticeable jamming or binding.

The levers 26,27 are pivoted by means of double-acting hydraulic cylinders. Thus, the rear end of the lever 27 is linked to a cylinder 33, the piston 34 of which is linked to a lug 35 secured to the fore end of the other lever 26 quite close to the frame 15. In the same way, the rear end of the lever 26 is linked to a lug 35' on the fore end of the lever 27 by means of a cylinder 33' and a piston 34'. Thus, the cylinders 33,33' cooperate in swinging the saw chains to and from each other, and by this cooperation the angular movements will be smooth and equally great for both legs.

In FIGS. 6 and 7, a saw chain indicated by a dotted line 10 is carried by five sprockets 36-40 journalled in a common plane within a V-shaped frame member 41. Similar to the embodiment described above, the saw chain part extending between the ends of the frame is guided in a rule 18' which is fixed to the outer end of a blade 17' mounted within the frame 41. Also here, the blade 17' may be fluted transversely on both sides, and one of the sprockets (sprocket 38) is connected to a hydraulic motor 22.

The frame member 41 has fixed to it two parallel arms 42,43 directed upwardly. The upper ends of these arms are by means of pivots 44 linked to a fork 45 partly indicated in FIG. 6 and connected to the beam of a crane in a manner not shown. The two pivots 44, only one of which is visible in FIG. 6, are mounted axially in alignment, and hydraulic cylinders, not shown, are provided to swing the frame 41 from an inoperative position adjacent to a tree 46 (shown by dotted lines in FIG. 6) to an operative position (shown by full lines), in which the tree 46 has been cut through. A portion 47 only of a piston pertaining to one of the hydraulic cylinders is indicated in FIG. 6.

In the embodiment shown in FIG. 6, the angle between the pivot shaft (the common axis of the pivots 44) and the operative part of the saw chain 10 is zero, and consequently the section surface obtained by the cut will be a segment of a cylindrical surface. In correspondence thereto, the saw blade 17' is curved transversely to the rule 18' to form a section of a cylinder with a radius equal to the perpendicular distance to the axis of the pivots 44. In fact, the plane of the saw chain forms a chord to the blade 17'.

It may be noted that the saw blade 17 or 17' and the guide rule 18 or 18' fixed thereto may also be formed integrally, in which case the flutes, if present, may extend from the outer edge of such a blade.

What I claim is:

1. A tree felling device adapted to be operated when suspended from a crane beam and comprising:
   at least one arcuate frame member pivotally mounted about a single pivot shaft;
   an endless saw chain journalled about a plurality of sprockets in a plane in each said at least one frame member;
   means associated with one of said sprockets for rotating said one sprocket and for thereby rotating said saw chain in an operative direction;
   said saw chain having a straight length thereof between two of said sprockets forming an operative part for cutting;
   a saw blade mounted within said frame member;
   said saw blade having a straight guiding edge portion extending between ends of said frame member and having therein a straight groove, said operative part of said saw chain being slidingly guided within said groove, at least said guiding edge portion of said saw blade having a thickness at least as great as the largest cross sectional shape of said saw chain, said guide edge portion of said blade thus forming means for supporting a tree during cutting and preventing said tree section from clamping downwardly on said operative part of said saw chain;
   said pivot shaft being located outside said saw chain and having an axis inclined at an angle of from 0°–60° to the principal direction of movement of said operative part of said saw chain; and
   the cross sectional shape of said saw blade, formed by any plane perpendicular to said pivot shaft, being an arc with a radius substantially corresponding to the perpendicular distance from said pivot shaft.

2. A tree felling device as claimed in claim 1, wherein said saw blade has on both sides thereof flutes extending transverse to said operative part of said saw chain.

3. A tree felling device as claimed in claim 1, wherein said at least one frame member comprises a single frame member; said angle is 0°; and the surface of said saw blade is a section of a cylinder.

4. A tree felling device as claimed in claim 1, wherein said at least one frame member comprises two frame members each having mounted therein a saw blade; and the surface of each said saw blade forms a portion of the envelope surface of a cone.

* * * * *